United States Patent
Shichman

[11] 4,054,941
[45] Oct. 18, 1977

[54] RANGE EXTENDER WITH GAIN

[75] Inventor: Harold Shichman, Scotch Plains, N.J.

[73] Assignee: Bell Telephone Laboratories, Incorporated, Murray Hill, N.J.

[21] Appl. No.: 752,900

[22] Filed: Dec. 22, 1976

[51] Int. Cl.² ............................................. H04M 1/76
[52] U.S. Cl. .................................................. 179/16 F
[58] Field of Search ............ 179/16 EA, 16 F, 17 OR

[56] References Cited

U.S. PATENT DOCUMENTS

| 3,671,676 | 6/1972 | Henry et al. | 179/16 F |
| 3,689,700 | 9/1972 | Lent | 179/16 F |
| 3,784,756 | 1/1974 | Nemchik | 179/16 F |
| 3,819,866 | 6/1974 | Hawley | 179/16 AA |

*Primary Examiner*—Thomas A. Robinson
*Assistant Examiner*—Randall P. Myers
*Attorney, Agent, or Firm*—Lucian C. Canepa; Maurice de Picciotto

[57] ABSTRACT

An improved Range Extender with Gain (REG) comprises a floating loop current detector, a new dial pulse reshaper and a new control logic circuit. The loop current detector is powered by means of a floating power supply which renders the detector insensitive to spurious common-mode subscriber loop currents. The dial pulse reshaper comprises logic gates with two feedback paths for regenerating minimum make and break periods. The control logic circuit for controlling the relays in the REG is an asynchronous logic circuit particularly designed to avoid conventional differentiation circuits and timing problems associated with Automatic Number Identification.

10 Claims, 7 Drawing Figures

RANGE EXTENDER WITH GAIN

BACKGROUND OF THE INVENTION

The present invention relates to telephone systems and more particularly to improved range extender circuits for long subscriber loops.

The portion of telephone circuit between the central office and the customer's station set usually consists of a twisted pair of wires. A maximum acceptable circuit resistance between the central office and the customer's equipment is often imposed since the longer the loop, the greater the attenuation and distortion of telephone signals. Signaling, i.e., transfer of nonvoice information such as dial pulsing, ringing and tripping of the line relay when a call is answered, may be impared by long subscriber loops. The latter may for example either reduce the loop current to the point where central office switches become inoperative, or distort trains of dial pulses resulting in erroneous connections. Similarly, long loops affect the transmission of voice signals by reducing the voice level or, by impairing the operation of the telephone transmitter.

Various known arrangements have been proposed to overcome transmission and signaling difficulties. One such known arrangement, called REG (Range Extender with Gain), is described in U.S. Pat. No. 3,671,676, issued to J. L. Henry et al. on June 20, 1972, and assigned to the assignee of the present application. In the signaling mode of this known REG, a resistive shunt is applied across the loop with each dial pulse to aid operation of the pulsing relay for an originating call. In case of a terminating call, the shunt is applied upon answer either during ringing or during the silent interval, to aid operation of the ring-trip relay. In the transmission mode, voice-frequency gain and greater transmitter voltage are applied to the loop. A loop current detector senses loop currents to control logic, timing and relay driving circuits thereby enabling shunt action and mode selection. While this known loop current detector operates effectively for its intended purpose, it is not insensitive to common-mode currents induced by ac power lines. Such currents can be exceptionally large on long subscriber loops. These common-mode currents, shunted to ground through resistors, relay or transformer windings, give rise to common-mode voltages. In turn, these voltages can adversely affect electronic circuitry connected across the tip and ring conductors of a subscriber loop. Furthermore, the type of control logic, timing and relay driving circuits included in known REGs does not minimize the cost and physical size of the REG.

Another known subscriber loop range extender is described in U.S. Pat. No. 3,784,756, issued to J. M. Nemchik on Jan. 8, 1974, and assigned to applicant's assignee. This known range extender has a through transmission path, a voice transmission path including a voice-frequency repeater, relay control circuitry for transferring back and forth between paths, and a dual mode loop current detector. In the idle state, the current detector is in a slow mode for the purpose of preventing spurious operation of the detector in response to 20Hz ringing current, except in response to an off-hook current flow. Immediately after detecting an off-hook condition, the current detector is switched to a fast mode for detecting 10Hz dial pulses. In this known arrangement, problems similar to the ones discussed in connection with the above-cited reference to Henry et al. are encountered.

In U.S. Pat. No. 3,819,866, issued to G. T. Hawley on June 25, 1974, and assigned to applicant's assignee, a loop current detector is described wherein loop currents cause one photoresponsive arm of a bridge to be illuminated, while longitudinal currents cause both photoresponsive arms of the bridge to be illuminated. The former provide a bridge output, while the latter leave the bridge in balance. Protection devices are required to protect the photoresponsive elements from high voltages and currents resulting from large longitudinal currents. This known light-coupled loop current detector does not ensure that large common-mode tip and ring voltages will not drive the detector devices out of their active regions of operation.

In some two-party loops, a resistor is inserted in the tip party station set for drawing current to ground when the tip party is off-hook. In such arrangements, the ring party station set does not include a resistor connected to ground. During an Automatic Number Identification (ANI) test, the tip and ring leads are connected together to a battery for determining the status of the station sets. If current is drawn from the battery to ground, it follows that the tip party station set is off-hook. If no current is drawn on the line, this indicates that the ring party station set is off-hook. The control logic circuitry associated with such known ANI test circuits may be set by a momentary break in current coming from the central office. Furthermore, due to the presence of differentiation circuits in the control logic, these ANI test circuits respond to noise signals and are subject to a slow recovery resulting from the time constant of the differentiation circuits.

BRIEF DESCRIPTION OF THE INVENTION

The foregoing problems are solved in an REG in accordance with an embodiment of the present invention comprising a floating loop current detector that uses relatively few components and that is electrically isolated from the system ground to prevent circuit performance degradation in the presence of common-mode loop currents. Moreover, in accordance with an embodiment of the present invention, the floating loop current detector is coupled to an improved signaling control circuit that controls the regeneration of dial pulses and the REG's response to Automatic Number Identification (ANI) tests. The foregoing improved signaling control circuitry enables a reduction in size and cost of the REG through the use of silicon integrated circuit techniques.

In an illustrative embodiment of the invention, an REG connected between a central office and a subscriber loop comprises a through transmission path for ringing and ANI signals, a voice amplification path, a floating loop current detector, and control logic circuitry for selectively transmitting telephone signals along either the through-path or the amplification path in response to the floating loop current detector. The floating loop current detector comprises a resistor bridge for supplying to a detector amplifier a voltage corresponding to the dc current on the subscriber loop. A power supply means applies to the loop current detector a dc voltage which varies in response to common-mode currents on the subscriber loop. The floating of the loop current detector renders it insensitive to spurious common-mode subscriber loop currents. An optical coupler couples the floating loop current detector output signals to a dial pulse reshaper for regenerating minimum make and break periods of dial pulses. A new logic circuit for controlling the transmission of telephone signals via either the amplification path or the through-path is coupled to the dial pulse reshaper. The logic circuit is such that conventional differentiation circuits and timing problems associated with ANI are substantially eliminated.

In a preferred embodiment of the present invention, the floating loop current detector comprises a resistor bridge coupled to the tip and ring leads, and an operational amplifier having its input terminals coupled to the bridge output terminals. The amplifier output terminal is coupled to a pair of threshold detectors, the output terminals of which are ORed and photocoupled to the dial pulse reshaper. The operational amplifier, the two threshold detectors, the logic OR gate, and the photocoupler are powered by means of a floating power supply for reducing the effects of common-mode currents and voltages, and preventing circuit performance degradation in the presence of such common-mode loop currents. The dial pulse rehaper comprises three NAND gates and two feedback paths used to regenerate minimum make and minimum break periods at its output terminal. The latter is coupled to a control logic circuit comprising a sequential asynchronous circuit which eliminates latch-up conditions. Furthermore, the control logic circuit is isolated from the tip and ring leads through optoelectronic couplers.

One object of the present invention is to improve the operation of a Range Extender with Gain in the presence of common mode loop currents.

Another object of the present invention is to reduce the size and cost of such as REG.

A still further object of the present invention is to incorporate in an REG circuits compatible with integrated circuit technologies that can perform loop current detection and signaling control functions.

These and other objects and advantages of this invention will appear more fully upon consideration of the various illustrative embodiments now to be described in detail in connection with the accompanying drawings.

DETAILED DESCRIPTION

Figure 1:
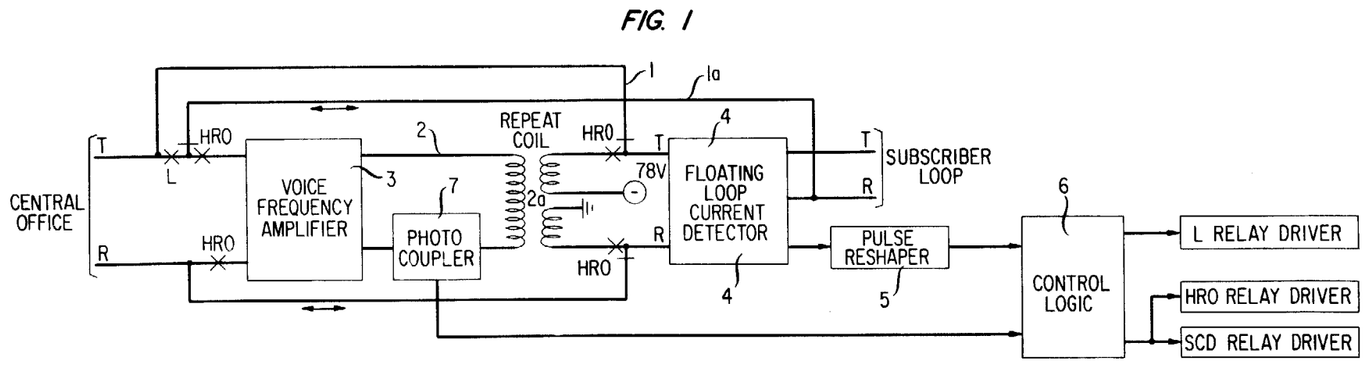
FIG. 1 is a simplified block diagram of a range extender in accordance with the present invention.

FIG. 1 illustrates a Range Extender with Gain, in accordance with the invention, connected between a central office switching machine and a remote subscriber's telephone set. Typically such a range extender will be physically located in the central office between the switching machine and the main distributing frame.

The range extender of FIG. 1 comprises a signaling or through transmission path 1 and a voice transmission path 2 having a voice frequency amplifier 3. A floating loop current detector 4 detects the hook status of the subscriber's telephone set by determining the presence or absence of dc loop current. The current detector 4 generates a signal indicating an off-hook or an on-hook loop state, which signal is delivered to a pulse reshaping circuit 5 which in turn generates a reshaped output signal and couples the latter to a control logic circuit 6. One input terminal of the control logic circuit corresponds to the reshaped output signal of the floating loop current detector 4 which senses the presence or absence of dc loop current in the subscriber's side of the range extender. The other input terminal of the control logic is coupled to a photocoupler 7 which senses the presence or absence of loop current in the central office side of the range extender. The output terminals of the control logic are coupled to L, HRO and SCD relay drivers. The main function of the L relay is to control the flow of current from the central office during dial pulsing. The main function of the HRO relay is to switch both the −78V loop battery and the extender voice amplifier 3 into the subscriber loop. The SCD relay controls the separation of the dc loop current from ac voltages generated by ringing currents on the subscriber loop.

Figure 2:
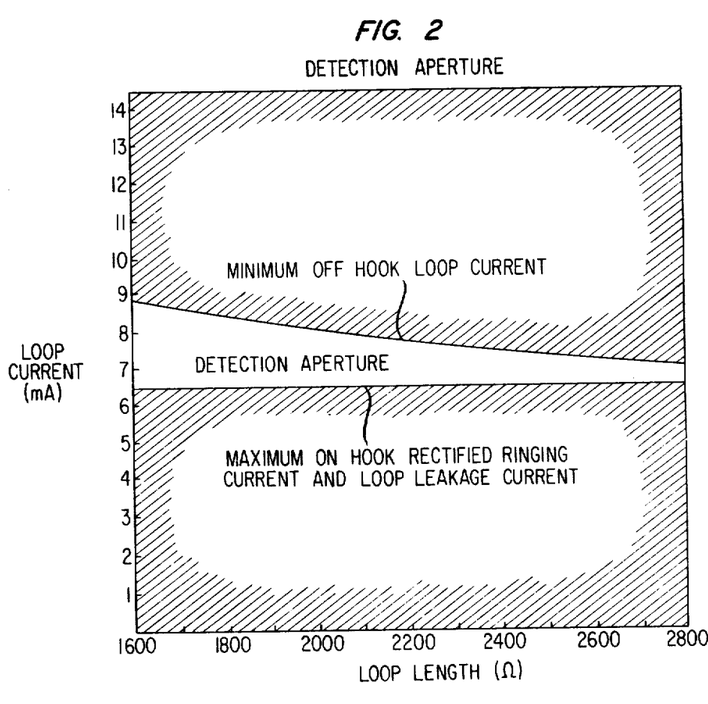
FIG. 2 is a graphical representation of the operational requirement of the range extender of FIG. 1.

The floating loop current detector 4 must operate when the customer goes off-hook during the ringing interval. The maximum ac ringer current that will appear on a loop will occur between the time a phone goes off-hook and the moment the ring trip relay removes the ringing voltage from tip (T) and ring (R). Since the maximum peak amplitude of the ringing voltage (140V) is approximately three times that of the battery voltage, the maximum 20Hz component is three times the dc component of loop current. In four-party selective ringing lines, which are common on long loops, dc current flows between either tip or ring and ground due to rectification of the 20Hz ringing signal by either ringer extenders or by gas tube selective ringing circuits. An acceptable on-hook loop current is 6.5mA, and in certain applications for which the range extender was designed, the minimum off-hook loop current is 7mA. This current is determined by the maximum loop resistance (2800 Ω), the maximum line relay resistance (3750Ω), the resistance of the off-hook telephone (200Ω), and the minimum battery voltage (48V) that is associated with the 3750Ω line relay. A threshold range between 6.5 and 7mA is thus established in which the loop current detector must operate to distinguish between the on-hook and off-hook line condition. A graphical representation of this threshold range versus loop resistance is shown in FIG. 2.

Dial pulses are breaks in dc loop current. Because of the bandlimited and dispersive nature of telephone wire pairs, dial pulses that travel in loaded loop having a resistance higher than 2000Ω cannot properly operate central office dial pulse receivers. The range extender must have the capability to detect the incoming distorted dial pulses and regenerate them so that they have a predetermined minimum loop current break period and a minimum loop current flow period. This affects the time response of the floating loop current detector.

In the on-hook state, i.e., no loop current, the L, HRO and SCD relays are unoperated. In this condition, the voice- frequency amplifier 3 of FIG. 1 and the repeat coil 2a are bypassed by the signal or through transmission path 1. The SCD relay places a filter (not shown in FIG. 1) in the signal path to separate the dc loop current from the ac voltage that is generated when there is ringing current on the subscriber loop. Upon detection of dc loop current, the L relay is first operated and then the HRO and SCD relays are operated. This action opens path 1, connects the voice-frequency amplifier 3 and the repeat coil 2a into the subscriber loop, and removes the filter from the signaling path. The third event increases the bandwidth of the loop current detector to allow the sensing of dial pulse breaks in dc loop current. The pulse reshaper 5 retimes the dial pulse breaks to compensate for transmission distortion before it operates, via control logic circuit 6, the L relay to regenerate the dial pulses on the central office end of the range extender. A timing circuit in the control logic inhibits the HRO from returning to the unoperated state during the regeneration of dial pulses. After loop current is initially detected and the HRO relay is operated, current flows from the central office through both the voice-frequency amplifier 3 and the primary side of the repeat coil 2a. This activates the photocoupler 7 to emit a signal coupled to the second input terminal of the control logic circuit 6.

Figure 3:
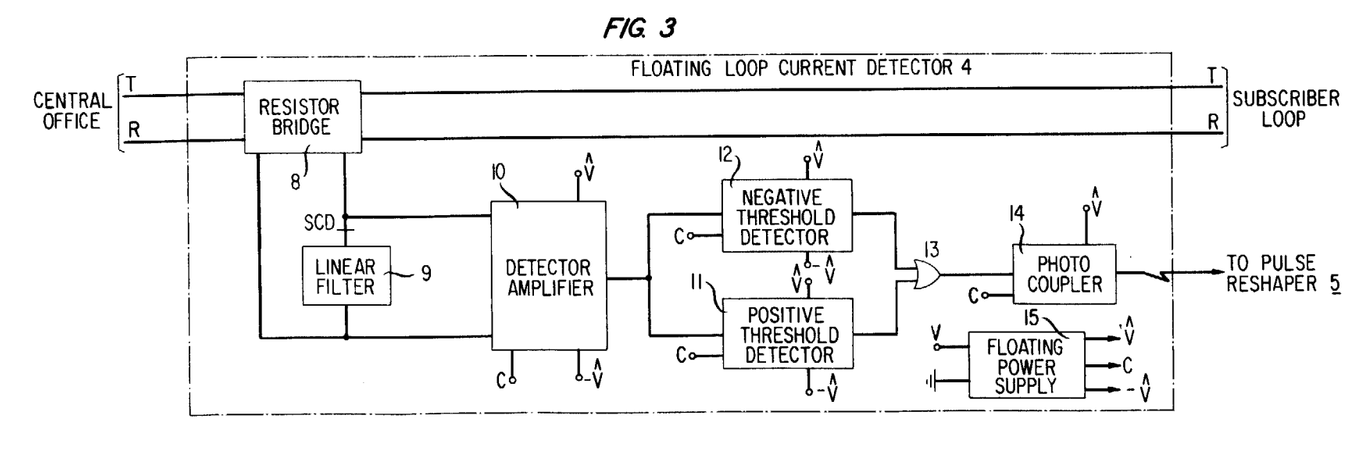
FIG. 3 is a block diagram of an illustrative embodiment of a floating loop current detector according to the present invention.

FIG. 3 illustrates a block diagram of an illustrative embodiment of the floating loop current detector 4 shown in FIG. 1. The basic function of the loop current detector is to measure the magnitude of the dc component of loop current and compare it to a fixed threshold within the threshold range mentioned above in connection with FIG. 2. A resistor bridge 8 separates dc loop currents (metallic) from common mode ac currents (longitudinal). A detector amplifier 10 senses the differential output voltage of the bridge and provides an amplified signal to threshold detectors 11 and 12. Positive and negative threshold detectors are used to allow for changes in battery polarities that are generated by selective multiparty ringing schemes and supervisory central office circuits used in step-by-step offices. The outputs of the two threshold circuits 11 and 12 are ORed together by logic gate 13 to provide a single output logic signal that indicates an off-hook or an on-hook loop state.

A floating power supply 15 (FIG. 3) is used to ensure that large common-mode tip and ring voltages do not drive the loop current detector devices out of their active regions of operation. The floating power supply achieves this objective by providing a local common potential C referred to ground equal to one-half of the sum of the tip and ring voltages. The voltages $\hat{V}$ and $-\hat{V}$ are referred to the local common potential C.

A photocoupler 14 conveys hook status from the current detector via pulse reshaper 5 to the logic that controls the range extender relays L, HRO and SCD, as shown in FIG. 1. Linear filter 9 and relay contact SCD provide a shunt path for the ac component of the resistor bridge output that occurs when ringing current is present. This filter is switched into a shunt path by means of the SCD relay during the time the subscriber loop is in the on-hook state. After an off-hook condition is detected, the linear filter 9 is bypassed to enable the detector to observe dial pulse breaks.

Figure 4:
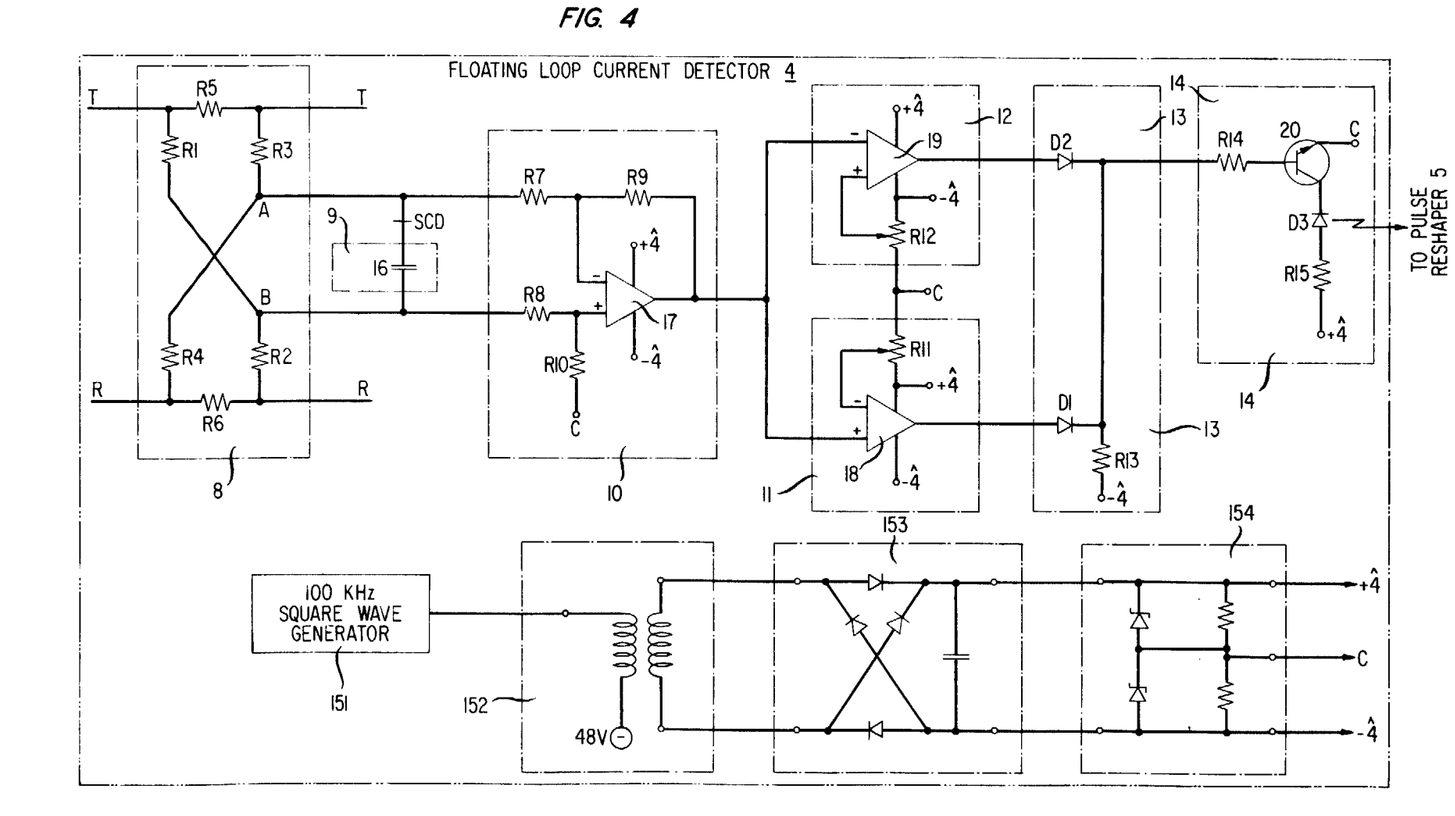
FIG. 4 shows a detailed circuit of the illustrative embodiment of FIG. 3.

An illustrative embodiment of a circuit configuration of the floating loop current detector 4 (FIGS. 1 and 3) is shown in FIG. 4. The resistor bridge 8, interfacing tip (T) and ring (R), comprises resistors R1 through R6. If these resistors were perfectly matched, the differential output voltage would be independent of any common mode loop current and dependent only upon the differential current flowing in the subscriber loop. Preferably resistors R1 through R4 each have a value of 1.1MΩ in order to maintain the on-hook leakage current less than 50μA. Also, resistors R1 through R4 protect the current detector from lightning surges. Sense resistors R5 and R6 each have a value of 100Ω to compromise between a desire to increase the bridge output voltage and the need to maximize the possible range extension that the range extender with gain can provide. In order to keep the floating loop current detector operating within the 0.5mA aperture shown in FIG. 2, a matching tolerance of ±0.1 percent is preferably maintained on all the bridge resistors. The output terminals A and B of the resistor bridge 8 are shunted by capacitor 16 in series with relay contact SCD, and further coupled to the input terminals of detector amplifier 10. The latter comprise a pair of input resistors R7 and R8 coupled to the input terminals of an operational amplifier 17. The operational amplifier 17 can be of a known type (e.g., 502AG type from the Western Electric Co. Incorporated) having an input offset current ranging from 0 to 40nA. This offset current interacts with the amplifier input resistor circuit formed by R7, R8 and R10 to produce an error voltage at the input terminals of the operational amplifier 17. Such input offset current, if held to 3nA over the operating temperature range of the amplifier 17, will not interfere with the detection of the hook condition of the subscriber loop. Resistor R10 is coupled between the local common C and one of th· amplifier 17 input terminals. Resistor R9, coupling the output terminal of the operational amplifier 17 to the other of its input terminals, has for example a value of 1.1MΩ, and resistors R7, R8 and R10 have respective illustrative values of 0.56MΩ, 0.56MΩ and 1.1MΩ.

In the event that the offset current cannot be kept within 3nA, the final error introduced by the fixed component of the offset current can be compensated for by adjusting the threshold voltage of the two threshold detectors 11 and 12. Each of the threshold detectors comprises an operational amplifier 18 or 19 and a variable resistor R11 and R12 coupled to one input terminal of the amplifier. Operational amplifiers 18 and 19 can be of a known type mode as the 502AG operational amplifier manufactured by Western Electric Company, Incorporated. The midpoint between variable resistors R11 and R12 is coupled to the local common terminal C. Amplifiers 18 and 19 are powered by means of voltages $+\hat{4}$ and $-\hat{4}$ generated by the floating power supply 15 (FIG. 3). The dc errors introduced by mismatches in the resistor bridge 8 can also be compensated for through adjustment of the threshold voltages of amplifier 18 and 19 by means of variable resistors R11 and R12. The output terminals of threshold detectors 11 and 12 are respectively coupled to the anodes of diodes D1 and D2 which in combination with resistor R13, coupled to power terminal $-\hat{4}$, constitute OR gate 13. As shown in the block diagram of FIG. 3, the output of OR gate 13 is coupled to a photocoupler 14 which illustratively comprises a switching transistor 20 and a light emitting diode D3. Transistor 20 has its base coupled via resistor R14 to the output of OR gate 13, its emitter coupled to the local common terminal C, and its collector coupled to the cathode of light emitting diode D3. The anode of light emitting diode D3 is coupled to the power supply terminal $+\hat{4}$ via resistor R15. Other known arrangements for generating an optical signal in response to an electrical signal could be substituted as photocoupler 14. In the illustrative embodiment of the invention shown in FIG. 4, resistors R13, R14 and R15 have respective values of 100KΩ, 10KΩ and 1KΩ.

As explained above, detector amplifier 10, threshold detectors 11 and 12, OR gate 13 and photocoupler 14 are powered by means of floating power supply 15 that generates $+\hat{V}$, $-\hat{V}$ and local common potential C. Illustratively such a floating power supply is a dc-to-dc converter comprising a 100 KHz square wave generator 151, e.g., an astable multivibrator powered by the central office talking battery, a coupling transformer 152, a rectifier/filter arrangement 153 coupled to the secondary winding of transformer 152, and a voltage regulator 154 coupled to the rectifier/filter arrangement 153 and delivering the potentials $+\hat{4}$, $-\hat{4}$ and C. Elements 151 through 154 are only schematically shown in FIG. 4 since each of these elements is known and commercially available. The 100KHz square wave generator 151 is chosen as a compromise between a desire to reduce the frequency in the interest of minimizing the energy losses consumed in switching the astable multivibrator and a desire to increase the frequency in the interest of minimizing the physical size of coupling transformer 152 of the floating power supply 15.

As shown in FIG. 4, point B of resistor bridge 8 is approximately at midpotential between tip lead (T) and ring lead (R) since R1 and R2 are equal. Since local common terminal C is coupled to point B via resistors R10 and R8, the local common potential will follow the variations of potential on the tip and ring leads. The foregoing causes a variation in $+\hat{V}$ and $-\hat{V}$ in voltage regulator 154 resulting in a loop current detector that floats with variations of potential on the tip and ring leads. This isolates the loop current detector from the system ground and prevents circuit performance degradation in the presence of common-mode loop currents.

Figure 5:
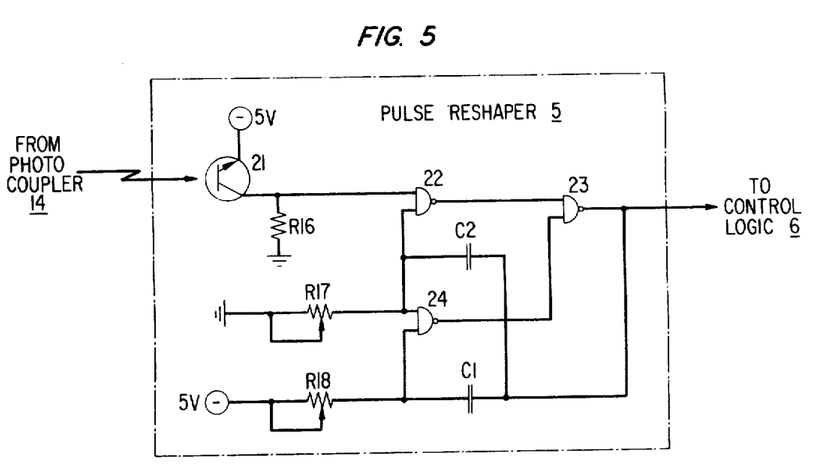
FIG. 5 shows an illustrative embodiment for the pulse reshaper circuit shown in FIG. 1.

An illustrative embodiment of pulse reshaper 5 (FIG. 1) in accordance with the present invention is shown in FIG. 5. As described above, the pulse reshaper 5 is optically coupled to the floating loop current detector 4 for further isolating the current detector from the nonfloating control logic circuit 6. The optical signal generated by light emitting diode D3 of photocoupler 14 is coupled to an npn phototransistor 21 at the input side of pusle reshaper 5. However, other optoelectronic devices capable of generating an electrical signal in response to an optical signal could replace phototransistor 21 without departing from the spirit of the present invention. Phototransistor 21 has its emitter coupled to a fixed, i.e., nonfloating, bias potential of −5 volts for example, and its collector terminal coupled to ground via a bias resistor R16 of the order of 10KΩ. The pulse reshaper of the present invention controls the regeneration of dial pulses by regenerating minimum "make" and "break" periods of the dial pulses. In order to reduce the size and cost of the range extender with gain of the present invention, three conventional NAND logic gates 22, 23 and 24 are used as active circuit elements of the pulse reshaper. The first input terminal of NAND gate 22 is coupled to the collector terminal of phototransistor 21, and the second input terminal of gate 22 is coupled to the first input terminal of gate 24 and to ground potential via a variable resistor R17. The output terminal of gate 22 is coupled to the first input terminal of gate 23, and the output terminal of gate 24 is coupled to the second input terminal of gate 23. A second variable resistor R18 is coupled between the bias potential terminal of −5 volts and the second input terminal of gate 24. Two feedback paths respectively coupling the output terminals of gate 23 to the second input terminals of gates 22 and 24 are used to regenerate the dial pulses. The first feedback path comprises capacitor C1 coupled between the output terminal of gate 23 and the second input terminal of gate 24, while the second feedback path comprises capacitor C2 coupled respectively to the first and second input terminals of gates 24 and 22. In the embodiment of FIG. 5, C1 and C2 have values of the order of 0.22μF and variable resistors R17 and R18 have maximum values of 1MΩ. By means of variable resistors R17 and R18 in combination with capacitors C1 and C2, the first feedback path is used to regenerate a minimum "make" period of 35 ms, and the second feedback path is used to regenerate a minimum "break" period of 45 ms, both periods being required to properly drive central office dial pulse receivers. This illustrative embodiment of the pulse reshaper of the present invention features the flexibility of independent setting of the regenerated minimum make and break dial pulse periods. Moreover, by using commercially available logic gates, both the size and cost of the improved range extender with gain according to the present invention are substantially reduced.

As described in the above-cited U.S. Pat. No. 3,784,756 to J. M. Nemchik, photocoupler 7 in FIG. 1 is utilized to detect an ANI tip party test. In order to permit the ANI tip party test to be made by the central office, the through transmission path 1 must be connected in the loop. When a tip party test is to be made, the central office switching machine shorts the tip and ring leads and connects them to a potential of −48 volts through a party test relay. Tip and ring being shorted, it follows that the voice-frequency amplifier current goes to zero. Thus, when an ANI test occurs, the current flowing through the photocoupler 7 ceases. Normally, with the voice-frequency amplifier 3 connected in the loop, the dc current through photocoupler 7 will generate an optical signal. However, with an ANI tip party test, as described above, the emission of the optical signal will cease. The foregoing should drop the HRO relay and maintain the L relay in an operated state after the detection of an ANI test. In order to prevent that any momentary break in current coming from the central office be interpreted as an ANI test, a new and improved control logic circuit 6 shown in FIG. 6 will be described hereinafter.

A typical photocoupler 7 may comprise a light emitting diode and an npn phototransistor. Optoelectronic couplers are commercially available and particularly suitable in applications requiring high electrical isolation and small package size. In accordance with the illustrative embodiment of the control logic circuit of FIG. 6, an npn phototransistor 25, optically coupled to a light emitting diode (LED) located in photocoupler 7, delivers a logic signal indicative of the presence of an ANI test. The emitter of the phototransistor 25 is connected to a bias potential terminal of −5 volts, and its collector is coupled to ground potential via a biasing resistor R19 of approximately 10KΩ. Therefore, depending upon the light emitting by the LED in photocoupler 7, the potential of the collector of the phototransistor 25 will switch from 0 volt to approximately −5 volts. The control logic of FIG. 6 uses a combination of NAND and NOR logic gates to realize an asynchronous logic circuit arrangement for commanding the driver circuits of the L, HRO and SCD relays. The state of such an asynchronous arrangement depends upon three parameters, namely, the presence of an ANI test signal; the status of the HRO relay; and the presence of a loop current detected by the floating loop current detector. As explained above, phototransistor 25 and its collector resistor R19 deliver the first of the above three parameters to the logic circuit. The second of such parameters, i.e., the status of the HRO relay, is delivered to the logic circuit by means of a circuit comprising, in series, bias potential terminal −5 volts, HRO contact, resistors R20 and R21, and ground potential. Resistors R20 and R21 have values of 50Ω and 10KΩ, respectively, such that the potential of the midpoint therebetween switches from 0 volt to approximately −5 volts depending on whether the HRO relay is operated or dropped. The third of the above-listed three parameters, i.e., the loop current status, is delivered by the floating loop current detector 4 via the pulse reshaper 5.

Figure 6:
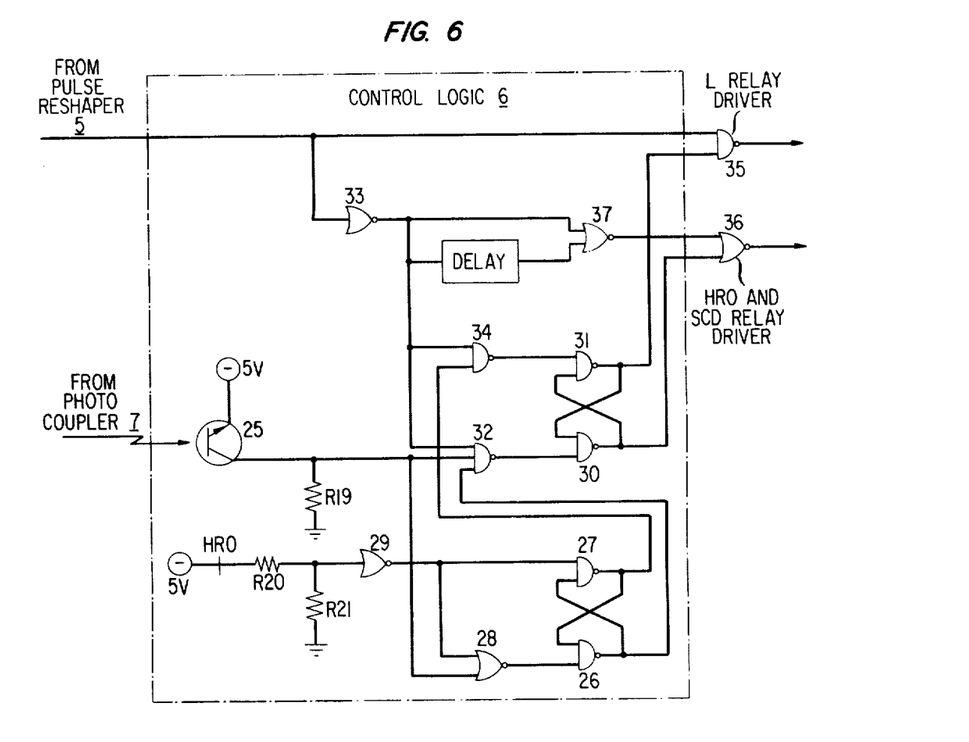
FIG. 6 shows an illustrative embodiment for the control logic circuit shown in FIG. 1.
Figure 7:
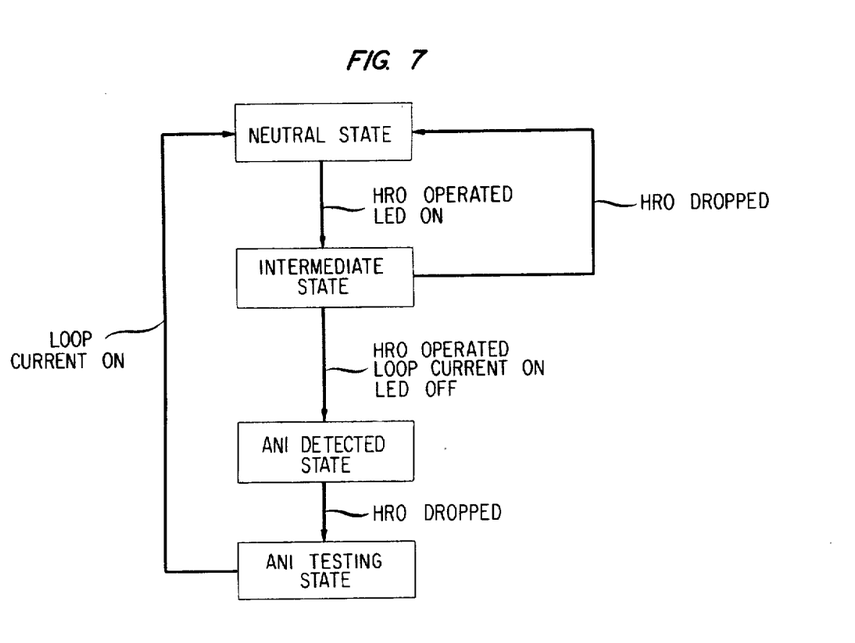
FIG. 7 is a state diagram of the control logic circuit of FIG. 6.

The asynchronous control logic circuit of FIG. 6 comprises a first and a second flip-flop circuit, and a plurality of logic gates for controlling flip-flop circuits and generating the relay driver signals. The first flip-flop circuit includes a pair of cross-coupled logic NAND gates 26 and 27. The state of the first flip-flop depends upon the ANI test signal via NOR gate 28, and upon the HRO relay condition via NOR gate 29, the latter being used as an inverter. The second flip-flop circuit includes a pair of cross-coupled logic NAND gates 30 and 31. The state of the second flip-flop depends upon the presence of an ANI test signal via NAND gate 32, the presence or absence of a loop current via inverter 33 and NAND gates 32 and 34, and the state of the first flip-flop circuit by means of NAND gates 32 and 34. One output of the second flip-flop circuit is combined with the loop current signal in NAND gate 35 for generating the L relay driver signal. The other output of the second flip-flop circuit is combined in logic NOR gate 36 with a further logic signal for generating the HRO and SCD relay driver signals. This further logic signal is generated by logic NOR gate 37 which receives at one input terminal the output signal of inverter 33, and at its second input terminal the output of inverter 33 delayed by a predetermined time period.

The timing function of the asynchronous logic circuit according to the present invention will be better understood when referring to the state diagram shown in FIG. 7. When the customer's station set is ON HOOK, the logic circuit 6 is in the neutral state. The logic circuit will enter the intermediate state when both the HRO relay is operated and the LED in the photocoupler 7 is turned on as a result of the customer's loop going OFF HOOK. This state is the standby state for an ANI test. If the HRO relay is returned to the unoperated condition, the logic circuit will return to the neutral state. However, if the LED is turned off while the HRO is in the operated state, and there is loop current flowing out from the REG to the subscriber, the logic circuit will go from the intermediate state to the ANI detected state. In this state, the HRO relay will be forced into the unoperated state and the L relay will be held operated. After the HRO relay drops, the logic circuit enters the ANI testing state and awaits the reappearance of loop current. After this occurs, the logic circuit will enter the neutral state and await the circuit conditions that will return the logic circuit to the intermediate state. Prior art race conditions are avoided by not allowing the control logic to react to loop current until the HRO relay is dropped. If the HRO relay is dropped in response to a momentary break in current coming from the central office, the control logic will enter the ANI testing state. If there is no break in the current flowing through the loop current detector, the machine will enter the neutral state. If there is a break in loop current, as a result of the HRO relay becoming unoperated, the logic circuit will remain in the ANI testing state until loop current flows from the central office through paths 1 and 1a of FIG. 1. There appears to be no way for the REG to remain "hung up" in an ANI testing configuration state as a result of missing the observation of a transient. Race conditions are avoided by the restraints designed into the state diagram which allow the logic circuit to change only one state as a result of an input level change.

In the above-described illustrative embodiment of an REG according to the present invention, the large valued resistors in the resistor bridge 8, the detector amplifier 10 and the threshold detectors 11 and 12, can be of the thick film type made on a single ceramic wafer. Thick film technology allows laser trimming of such resistors after placing beam lead chips on the host ceramic wafer. This would permit adjustment of the detecting threshold voltages and compensate for mismatches in the bridge resistors.

The improved signaling control logic circuit of the present invention avoids the use of large valued resistors and capacitors for rendering the circuit compatible with silicon integrated circuit technologies. The pulse reshaper 5 and the control logic 6 make use of well-known logic circuits. Standby power and noise margin are major considerations in selecting a specific logic design. Standby power is of interest since rural wire centers may house several thousand REGs. Thus, the total standby power consumed by these REGs may amount to a significant part of the central office power. In the interest of minimizing power consumption, MOS logic may be used in pulse reshaper 5 and control logic circuit 6. Maximizing noise protection may be achieved by using CMOS logic.

The present invention has been described with reference to a particular embodiment. It is to be understood, however, that the described embodiment is merely illustrative of the principles and applications of the invention. Numerous modifications may be made by those skilled in the art without departing from the spirit and scope of the invention.

What is claimed is:

1. A range extender with gain used to provide selective amplification to signals applied to a relatively long subscriber loop comprising:
   a through-transmission path coupled to said subscriber loop;
   a voice amplification path coupled to said subscriber loop;
   a loop current detector coupled to said subscriber loop;
   means for delivering to said detector a dc voltage corresponding to the dc current on the subscriber loop;
   means for supplying a bias potential to said detector; and
   control means for selectively applying telephone signals to either of said paths in response to the loop current detector, CHARACTERIZED IN THAT the range extender further comprises means responsive to common-mode time-varying currents on the subscriber loop for varying the bias potential supplied to the loop current detector thereby rendering said loop current detector insensitive to said common-mode time-varying currents.

2. A range extender according to claim 1 wherein the control means comprise a pulse reshaper circuit optically coupled to the variably biased loop current detector for further isolating said detector from the range extender ground potential.

3. A range extender according to claim 2 wherein the control means further comprise a logic circuit having a first input terminal coupled to the pulse reshaper circuit output terminal, a second input terminal optically coupled to an automatic number identification (ANI) tip party test signal, and a third input terminal coupled to a contact of a path selection relay.

4. A range extender according to claim 3 wherein said logic circuit is a four state asynchronous logic circuit designed to prevent the range extender from remaining in an unrecoverable ANI testing state.

5. A range extender according to claim 2 wherein said pulse reshaper circuit comprises three logic NAND gates and two feedback couplings for regenerating minimum make and minimum break dial pulse periods.

6. A range extender with gain used to provide selective amplification to signals applied to a relatively long subscriber loop comprising:
a through-transmission path coupled to said subscriber loop;
a voice amplification path coupled to said subscribed loop;
a loop current detector comprising an amplifier having an output terminal and means for delivering to said amplifier a dc voltage corresponding to the dc current on the subscriber loop;
means for supplying a bias potential to said loop current detector; and
relay control means for selectively applying telephone signals to either of said paths in response to the loop current detector, CHARACTERIZED IN THAT the loop current detector further comprises:
a pair of threshold detectors each having an input terminal coupled to the amplifier output terminal and each having an output terminal;
a logic gate coupled to said threshold detectors' output terminals;
a photocoupler for generating an optical signal in response to the gate output signal; and
means responsive to common-mode time-varying currents on the subscriber loop for varying the bias potentials supplied to said amplifier, threshold detectors, gate and photocoupler thereby rendering the loop current detector insensitive to said common-mode time-varying currents.

7. A range extender according to claim 6 wherein said generating optical signal is coupled to the relay control means for selectively establishing a loop connection through said voice amplification path or said through-transmission path.

8. A range extender according to claim 7 wherein said relay control means comprise a pulse reshaper circuit coupled to said optical signal for regenerating dial pulse periods.

9. A range extender according to claim 8 wherein said pulse reshaper circuit comprises first, second and third logic NAND gates, and first and second feedback paths coupling the output terminal of the third gate to the input terminals of the first and second gates for respectively regenerating minimum make and minimum break dial pulse periods.

10. A range extender according to claim 8 wherein the relay control means further comprise a four-state asynchronous logic circuit having a first input terminal coupled to the pulse reshaper circuit output terminal, a second input terminal optically coupled to an automatic number identification (ANI) tip party test signal, and a third input terminal coupled to a contact of a selective path relay.

* * * * *